United States Patent Office 3,809,647
Patented May 7, 1974

3,809,647
GREASE COMPOSITION
Pascal Baudouin, Notre-Dame-de-Gravenchon, France, assignor to Mobil Oil Corporation, New York, N.Y.
No Drawing. Filed Feb. 2, 1973, Ser. No. 329,238
Claims priority, application France, Nov. 7, 1972, 7239361
Int. Cl. C10m 5/12, 5/16, 5/26
U.S. Cl. 252—28                                10 Claims

ABSTRACT OF THE DISCLOSURE

Grease compositions are provided comprising a lubricating vehicle, a grease-forming quantity of a thickening agent and a small amount of a graft copolymer comprising polyethylene modified with a minor amount of an unsaturated aliphatic dicarboxylic acid or its anhydride.

BACKGROUND OF THE INVENTION

(1) Field of the invention

This invention relates to grease compositions and relates more particularly to grease compositions having improved resistance to water wash-out and resistance to softening at high temperature conditions.

(2) Description of the prior art

The prior art has, heretofore, proposed the incorporation of certain copolymers, such as ethylene-vinyl acetate copolymers, for improving water wash-out resistance of greases. It has also been proposed to upgrade the resistance of greases to water dilution by incorporation therein of unmodified polyethylenes and atactic polyethylenes. The use of such polymeric materials has however, not been generally applicable to various thickened greases. Thus, calcium-lead complex thickened formulations have, in such connection, not been effectively improved with respect to water wash-out resistance. It has been found that such greases, as well as other grease formulations, while exhibiting satisfactory resistance to water wash-out, under normal service conditions require improvement to resist severe water wash-out under conditions of some vibration service.

SUMMARY OF THE INVENTION

In accordance with the present invention, there are provided grease compositions having improved resistance to water wash-out and resistance to softening at high temperature conditions, containing, as an improving agent, a small amount, sufficient to incorporate the aforementioned resistance, of a graft copolymer comprising polyethylene modified with a minor amount of an unsaturated dicarboxylic acid or its anhydride, as more fully hereinafter described.

More specifically, the graft copolymers of the grease formulations of the present invention comprise a dicarboxylic acid-modified polyethylene. The dicarboxylic acid modifier is unsaturated, being typified by maleic acid and fumaric acid. Preferably, the modifier is maleic acid or maleic anhydride. The modifier represents a minor amount of the graft copolymer generally present in an amount less than 10 weight percent concentration and preferably less than 5 weight percent. It is to be understood, however, that the acid or anhydride thereof can be used to form the modified polyethylene. An outstanding material is a polyethylene modified with a minor amount of maleic acid or its anhydride, marketed by Eastman Chemical Products, Inc. as Epolene C16 and having the following properties:

Molecular weight, number average, approx. ---- 7,000
Viscosity, Brookfield, cps. 149° C. ------------ 12,500
Ring and ball softening point (ASTM D36–26),
  ° C. ----------------------------------------- 106
Penetration hardness, tenths of mm. (100 g./5
  sec./25° C.) --------------------------------- 5

The graft copolymers utilized in the grease compositions of this invention generally are characterized by a molecular weight in the range of 5,000 to 10,000 and can be formed by methods well known in the art, such as those shown in the text "Block and Graft Copolymers" of Burlant and Hoffman; Reinhold; 1960.

A wide variety of thickening agents can be used in the greases of this invention. Included among the thickening agents are alkali and alkaline earth metal soaps of fatty acids and fatty materials having from about 12 to about 30 carbon atoms per molecule. The metals are typified by sodium, lithium, calcium and barium. Fatty materials are illustrated by stearic acid, hydroxystearic acid, stearin, cottonseed oil acids, oleic acid, palmitic acid, myristic acid and hydrogenated fish oils.

Other thickening agents include salt and salt-soap complexes as: calcium stearate-acetate (Pat. No. 2,197,263); barium stearate-acetate (Pat. No. 2,564,561); calcuim stearate-caprylate-acetate complexes (Pat. No. 2,999,065); calcium caprylate-acetate (Pat. No. 2,999,066); and calcium salts and soaps of low-, intermediate- and high-molecular weight acids and of nut oil acids; and aluminum-complexes.

Additional thickening agents comprise polyureas, substituted ureas, phthalocyanines, indanthrene, pigments such as perylimides, pyromellitdiimides, ammeline, and carbon black.

Other thickening agents employed in the new grease compositions can include essentially organophilic clays. Such thickening agents can be prepared from clays which are initially hydrophilic in character, but which have been converted into an organophilic condition by the introduction of long chain hydrocarbon radicals into the surface of the clay particles, prior to their use as a component of a grease composition, as, for example, by being subjected to a preliminary treatment with an organic cationic surface active agent, such as a onium compound. Typical onium compounds are tetra alkyl ammonium chlorides, such as dimethyl dioctadecyl ammonium chloride, dimethyl dibenzyl ammonium chloride and mixtures thereof. This method of conversion, being well known to those skilled in the art, is believed to require no further discussion, and does not form a part of the present invention. More specifically, the clays which are useful as starting materials in forming the thickening agents to be employed in the grease compositions, can comprise the naturally occurring chemically unmodified clays. These clays are crystalline complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups such as sodium. Hydrophilic clays which are particularly useful for conversion to desired thickening agents include montmorillonite clays, such as bentonite, attapulgite, hectorite, illite, saponite, sepiolite, biotite, vermiculite, zeolite clays and the like.

Preferred thickening agents are calcium lead-acetate complexes employed in grease formulations as described in U.S. Pat. 2,898,297, issued Aug. 4, 1959. Such thickening agents comprise a mixture of (A) alkaline earth metal soaps and salts therewith, the alkaline earth metals being selected from the group consisting of calcium and a mixture (B) of calcium and barium, not more than about 15% of barium on a chemical equivalent basis being associated in said mixture (B) with calcium in said soaps and salts, the mixture (A) of said soaps and salts being present in a grease-forming quantity, and the metal salts of said mixture (A) being salts of a low molecular weight unsubstituted saturated monocarboxylic acid (I) having from 1 to 6 carbon atoms per molecule, and the metal soaps of said mixture (A) being soaps of different acids with said acid (I) as shown in the following tabulation:

| Acid | Number of carbon atoms | Weight percent of total acids |
|---|---|---|
| (I) Low molecular weight | 1–6 | 10–50 |
| (II) Intermediate molecular weight | 7–12 | 5–50 |
| (III) High molecular weight | (1) | 5–40 |
| (IV) Oil acids | 8–18 | 25–60 |

1 At least 13.

said acid (II) being selected from unsubstituted, monohydroxy-substituted and methyl-substituted saturated aliphatic monocarboxylic acids, said acids (III) being selected from unsubstituted and monohydroxy-substituted saturated aliphatic monocarboxylic acids and monounsaturated aliphatic monocarboxylic acids; and said oil acids being nut oil acids comprising mixtures of acids containing from about 8 to 18 carbon atoms per molecule and predominating in $C_{12}$–$C_{14}$ acids; and from about 0.5 to about 5%, by weight (expressed as PbO) of at least one lead compound of at least one of said acids (I) through (IV).

Oils used in the greases of this invention can be mineral or synthetic oils of lubricating viscosity. Suitable mineral oils have a viscosity (SUS) of at least 40 seconds at 100° F., and particularly those within the range of about 60 seconds to about 6000 seconds at 100° F.

Synthetic vehicles can be used, instead of mineral oils, or in combination therewith. Typical synthetic vehicles are: polypropylene, polypropylene glycol, trimethylol propane esters, neopentyl and pentaerythritol esters, di(2-ethyl hexyl) sebacate, di(2-ethyl hexyl) adipate, dibutyl phthalate, polyethylene glycol di(2-ethyl hexoate), fluorocarbons perfluoro-alkyl-polyethers, silicate esters, silanes, esters of phosphorus-containing acids, liquid ureas, ferrocene derivatives, hydrogenated mineral oils, chain type polyphenyl, siloxanes, and silicones (polysiloxanes) fluorosilicones, alkyl-substituted diphenyl ethers typified by a butyl-substituted bis-(p-phenoxy phenyl) ether, and phenoxy phenyl ethers.

Other hydrocarbon oils include synthetic hydrocarbon polymers having improved viscosity indices, which polymers are prepared by polymerizing an olefin, or mixture of olefins, having from 5 to 18 carbon atoms per molecule in the presence of an aliphatic halide and a Ziegler-type catalyst.

It is to be understood, however, that the compositions contemplated herein can also contain other characterizing materials. For example, antioxidants such as phenyl alphanaphthylamine (PAN), corrosion inhibitors, extreme pressure agents, viscosity index agents, and fillers can be used. Among such materials are colloidal silica, calcium acetate, calcium carbonate and molybdenum disulfide. Such characterizing materials do not detract from the lubricating value of the compositions of this invention, nor do they detract from the beneficial character of the graft polymers; rather, the characterizing materials serve to impart the ir customary properties to the particular compositions in which they are incorporated.

The greases of this invention can be prepared in accordance with conventional grease manufacturing procedures, as by any mixing technique wherein solid particles are wetted by a fluid. Typical equipment for such use includes a colloid mill, 3-roll ink mill, Manto-Gaulin homogenizer and the like.

The quantity of the graft copolymer improving agent comprising polyethylene modified with a minor proportion of an unsaturated dicarboxylic acid or its anhydride, employed in the grease of the present invention, is, as previously indicated, a small amount sufficient to incorporate in the grease formulation the desired resistance to water wash-out and resistance to softening at high temperature conditions. Particularly preferred are greases in which the graft copolymer is present in an amount of at least about 0.01% by weight. Generally, the presence of the specified graft copolymer in an amount from about 0.1 to about 5% by weight, has been found to produce highly satisfactory improved grease compositions.

DESCRIPTION OF SPECIFIC EMBODIMENTS

In order to demonstrate the improvement of water wash-out resistance and resistance to softening at elevated temperatures, employing the above-described graft copolymers, typical calcium-lead complex greases were prepared, having the formulation shown in the following table.

FORMULATION OF BASE GREASES A, B, C

|  | A | B | C |
|---|---|---|---|
| Mineral oils: |  |  |  |
| 650″ solv. naphthenic neutral | 64.20 | 61.74 | 48.00 |
| 150″ solv. paraffinic bright | 18.11 | 17.93 | 29.16 |
| Thickener: |  |  |  |
| Caprylic acid | 1.82 | 1.90 | 1.98 |
| Coconut oil, crude | 4.62 | 4.83 | 5.04 |
| Acetic acid, glacial | 3.03 | 3.17 | 3.30 |
| Hydrogenated tallow fatty acids | 1.53 | 1.60 | 1.67 |
| Lime | 3.82 | 3.98 | 4.18 |
| Litharge | 1.09 | 1.14 | 1.19 |
| Additives—Extreme pressure and anti-wear: |  |  |  |
| Calcium acetate dispersion |  |  | 5.00 |
| Antimony di thio carbamate |  |  | 1.20 |
| Chlorinated wax | 2.00 | 2.00 |  |
| Molybdenum disulphide |  | 1.00 |  |
| Anti-oxidant: |  |  |  |
| Agerite stalite | 0.40 | 0.40 |  |
| Ditertiary butylparacresol | 0.40 | 0.40 |  |
| Anti-rust: |  |  |  |
| Sodium nitrite dispersion |  | 0.80 |  |
| Amic acid prepared by reacting 75 g. glycine with 275 g. tetrapropenyl succinic anhydride |  | 0.30 |  |
| Appearance: |  |  |  |
| Titanium dioxide | 0.02 |  | 0.02 |
| Hydrocarbon asphaltic residue | 0.10 |  | 0.50 |
| Total | 101.14 | 101.19 | 101.26 |
| Water removed | 1.14 | 1.19 | 1.26 |
| Total, less water removed | 100.00 | 100.00 | 100.00 |

As is shown in the following examples, varying quantities of the graft copolymer comprising polyethylene modified with a minor amount of an unsaturated dicarboxylic acid or its anhydride were incorporated in the above greases for evaluation. The respective grease formulations, containing the indicated amounts of the graft copolymer, were subjected to standard ASTM tests described below.

TEST 1

Test according to the ASTM D1263–61 standard; filling 90 g.; temperature 104.4° C.; speed 600 r.p.m.; duration 6 hours.

| Example | Penetration, ASTM D217, before test (worked) | Leakage of grease, percent |
|---|---|---|
| 1 Base grease A | 302 | 5.3 |
| 2 Base grease A plus 0.5% Epolene $C_{15}$ | 312 | 2.9 |

This test shows that the addition of Epolene $C_{16}$ at a concentration of 0.5% by weight upgrades the resistance of the base grease to softening and to separation of the oil in a wheel hub at approximately 100° C.

TEST 2

This test carried out under more severe conditions than those of test 1 showed upgrading of the grease with respect to resistance to softening and separation of the oil at high temperature.

ASTM D1263–61 TEST

Filling 130 g.; temperature 130° C.; speed 600 r.p.m.; duration 6 hours.

| Example | ASTM D217 penetration before test (unworked/worked) | Leakage of grease, percent |
|---|---|---|
| 3 ..... Base grease A .................. | 270/292 | 15.3 |
| 4 ..... Base grease A plus 0.3% Epolene $C_{16}$ | 275/302 | 12.9 |

TEST 3

This test showed upgrading of the grease with respect to resistance to softening in the hubs of wheels.

Apparatus of the test: Hubs of Unic road tractor on a dynamometric chassis speed 50/60 km./hr.; applying brakes to obtain a temperature of 100° C. in continued service of the rotations of the hubs; distance traversed—5,000 km.

| Example | ASTM D217 penetration (unworked) before test | After test | Difference |
|---|---|---|---|
| 5 ..... Base grease B .................. | 259 | 434 | 175 |
| 6 ..... Base grease B plus 0.3% Epolene $C_{16}$ | 258 | 295 | 37 |

The above comparative results show that the base grease with additive Epolene $C_{16}$ softens much less than the same grease without the additive under the effect of vibration and centrifugation in the hub of a road tractor revolving at a substantially constant temperature of 100° C. because of frequent application of the brakes.

TEST 4

This test illustrates upgrading of the mechanical stability of the grease in rotations subject to vibration.

Apparatus of the test: SKF V2F railroad axle box speed 1860 r.p.m.; filling of the box 800 g.; grease vibration frequency—60 hammer blows/minute; duration 14 days; test simulates 100,000 km. of service vibration severity—12 g. accelerating at 300 km./hr.

| Example | Penetration, ASTM D217, before test (unworked/worked) | Grease ejected after test (grams) |
|---|---|---|
| 7 ..... Base grease A .................. | 270/292 | 375 |
| 8 ..... Base grease A plus 0.3% Epolene $C_{16}$ | 275/302 | 268 |

The above comparative data show that in the axle box, whose operational parameters simulate severe shearing induced by high rotational speed while simultaneously subjected to severe vibration to promote grease movement into the moving elements of the axle box bearings. The addition of 0.3% of Epolene $C_{16}$ in the base grease diminishes the resultant leakage of softened grease through the labyrinth seal, establishing that the mechanical stability of the grease is upgraded.

TEST 5

This test again illustrates upgrading of the grease (Specification DCEA 78 Type II, method 5.4).

Method: 150 g. of grease in the exposition "Shell Roll Test"; test during 100 hrs. at 10 r.p.m. and 63.5±3° C.

| Example | ASTM D217 penetration (worked) before test | After test | Difference |
|---|---|---|---|
| 9 ..... Base grease A .................. | 294 | >450 | >156 |
| 10 .... Base grease A plus 0.3% Epolene $C_{16}$. | 288 | 370 | 82 |
| 11 .... Base grease A plus 0.6% Epolene $C_{16}$ | 287 | 336 | 49 |
| 12 .... Base grease A plus 0.9% Epolene $C_{16}$. | 285 | 336 | 51 |

The above data show that the progressive addition of Epolene $C_{16}$ causes a lessening of softening of the base grease in a test at low speed corresponding to a low rate of shearing.

TEST 6

This test illustrates upgrading of the grease with respect to resistance to water wash-out.

Method ASTM D1264–63, severity of water impact increases by increase of the annular gap between bearing housing and shield.

| Example | ASTM D217 penetration before test (unworked/worked) | Loss of grease by wash-out, percent |
|---|---|---|
| 13 ...... Base grease C .................. | 270/302 | 30 |
| 14 ...... Base grease C plus 0.3% Epolene $C_{16}$. | 275/292 | 20 |
| 15 ...... Base grease C .................. | | 316 | 33 |
| 16 ...... Base grease C plus 0.5% Epolene $C_{16}$. | 303 | 8 |

The above comparative results show that upgrading of the cohesive properties of the grease improves its resistance to water wash-out. It will be evident that the resistance to water wash-out is improved in the base greases by the addition of small quantities of Epolene $C_{16}$; at a concentration of 0.3% the loss by wash-out is reduced by one third and at a concentration of 0.5% by two-thirds.

Upon upgrading their cohesive properties, the base greases containing Epolene $C_{16}$, possess a better resistance to leakage under rotational working conditions of severe vibration, centrifugation, and temperatures such as those encountered in hubs of hot running heavily loaded trucks and automobiles with disk brakes, and railroad axle boxes. With the improvement of their resistance to water wash-out, the greases of this invention can be utilized under working conditions involving severe water washing.

EXAMPLES 17–19

A grease was prepared employing an organophilic clay as the thickening agent comprising by weight 8% clay modified by the addition thereto of dimethyl dibenzyl and dimethyl ditallow groups (Baragel), 45% of a paraffinic mineral oil bright stock, 46.5% of a light neutral paraffinic mineral oil and 0.5% of an antioxidant of octylated diphenyl amine (Vanlube SL). The base grease was modified by the incorporation therein respectively of 0.3 and 0.6 weight percent of polyethylene modified with a minor proportion of maleic acid (Epolene $C_{16}$).

The grease was formulated by preparing a dispersion of the clay thickening agent in the combined mineral oils in a grease kettle at a temperature of 150–200° F. Dispersion was facilitted by the presence of a volatile dispersing agent, i.e., water. The use of a homogenizer, namely a colloid mill employing high shear rate promoted the dispersion of the clay thickener in oil.

In those greases in which Epolene $C_{16}$ was incorporated, such material was added at 200° F.

The grease was then heated to 350° F. to evaporate the water and then cooled. During cooling, the antioxidant was added.

The base grease and the Epolene $C_{16}$-containing greases were tested for penetration. The results of testing were as follows:

| Example | | Penetration half scale (unworked/ worked) |
|---|---|---|
| 17 | Base grease | 160/220 |
| 18 | Base grease plus 0.3% Epolene $C_{16}$ | 142/158 |
| 19 | Base grease plus 0.6% Epolene $C_{16}$ | 102/133 |

The above results illustrate the improved shear resistance and structural stability imparted by Epolene $C_{16}$ resulting in stiffer consistency (lower penetration) as Epolene $C_{16}$ concentration was increased.

While the invention has been described with reference to preferred compositions and components therefor, it will be understood, by those skilled in the art, that departures from the preferred embodiments can be effectively made and are within the scope of the preceding specification and following claims.

What is claimed is:

1. A grease composition comprising a lubricating vehicle, a grease forming quantity of a thickening agent and a small water wash-out reducing amount of a graft copolymer having an approximate molecular weight between 5,000 and 10,000 comprising polyethylene modified with a minor amount of an unsaturated aliphatic dicarboxylic acid or its anhydride wherein the amount of the dicarboxylic acid or its anhydride is less than 10 weight percent of the copolymer.

2. The grease composition of claim 1 wherein the unsaturated dicarboxylic acid is maleic acid.

3. The grease composition of claim 1 wherein the unsaturated dicarboxylic anhydride is maleic anhydride.

4. The grease composition of claim 1 wherein the amount of graft copolymer is between about 0.1 and about 5 weight percent.

5. The grease composition of claim 1 wherein the lubricating vehicle is a mineral lubricating oil.

6. The grease composition of claim 1 wherein the lubricating vehicle is a synthetic lubricating oil.

7. The grease composition of claim 1 wherein the thickening agent is a calcium lead complex soap.

8. The grease composition of claim 1 wherein the thickening agent is an organophilic clay.

9. The grease composition of claim 1 wherein the lubricating vehicle is a mineral lubricating oil, wherein the thickening agent is a calcium lead complex soap and wherein the unsaturated dicarboxylic acid or its anhydride is maleic acid or maleic anhydride.

10. The grease composition of claim 9 wherein the amount of the graft copolymer is between about 0.1 and about 5 weight percent.

References Cited

UNITED STATES PATENTS

| | | | |
|---|---|---|---|
| 2,977,334 | 3/1961 | Zopf et al. | 252—56 D |
| 3,231,498 | 1/1966 | Vries | 252—56 D |
| 3,231,587 | 1/1966 | Rense | 252—56 D |
| 3,488,721 | 1/1970 | Frye | 252—59 |
| 3,694,176 | 9/1972 | Miller | 252—56 R |

DANIEL E. WYMAN, Primary Examiner

I. VAUGHN, Assistant Examiner

U.S. Cl. XR.

252—36, 56 R, 56 D